Oct. 4, 1966  E. O. SCHWEITZER, JR  3,277,368
ELECTRIC MEASURING INSTRUMENT WITH POINTER CLAMP
Filed May 6, 1963  2 Sheets-Sheet 1
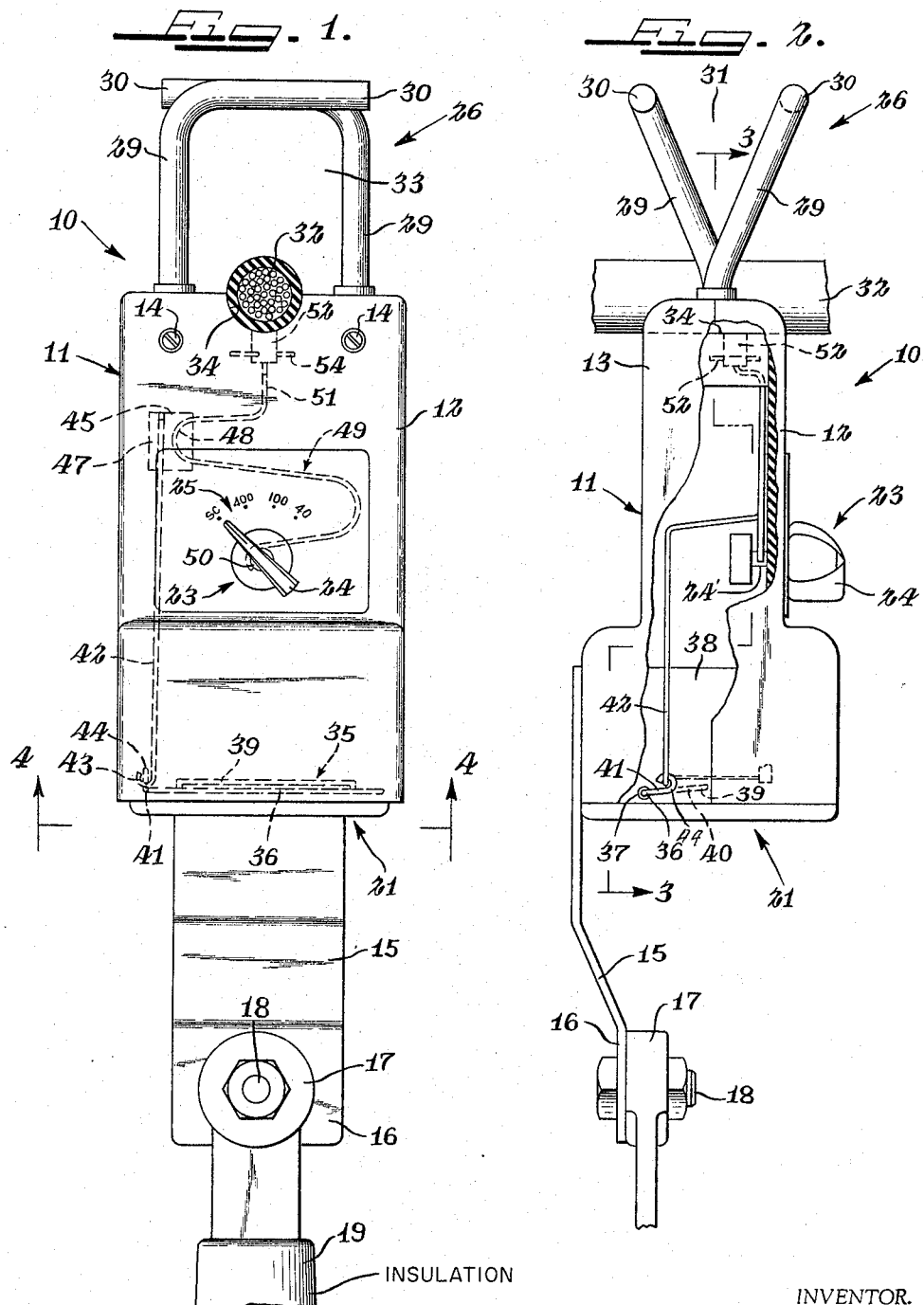
INVENTOR.
EDMUND O. SCHWEITZER, JR.
BY
Robert R. Lockwood
Atty.

Oct. 4, 1966     E. O. SCHWEITZER, JR     3,277,368
ELECTRIC MEASURING INSTRUMENT WITH POINTER CLAMP
Filed May 6, 1963     2 Sheets-Sheet 2
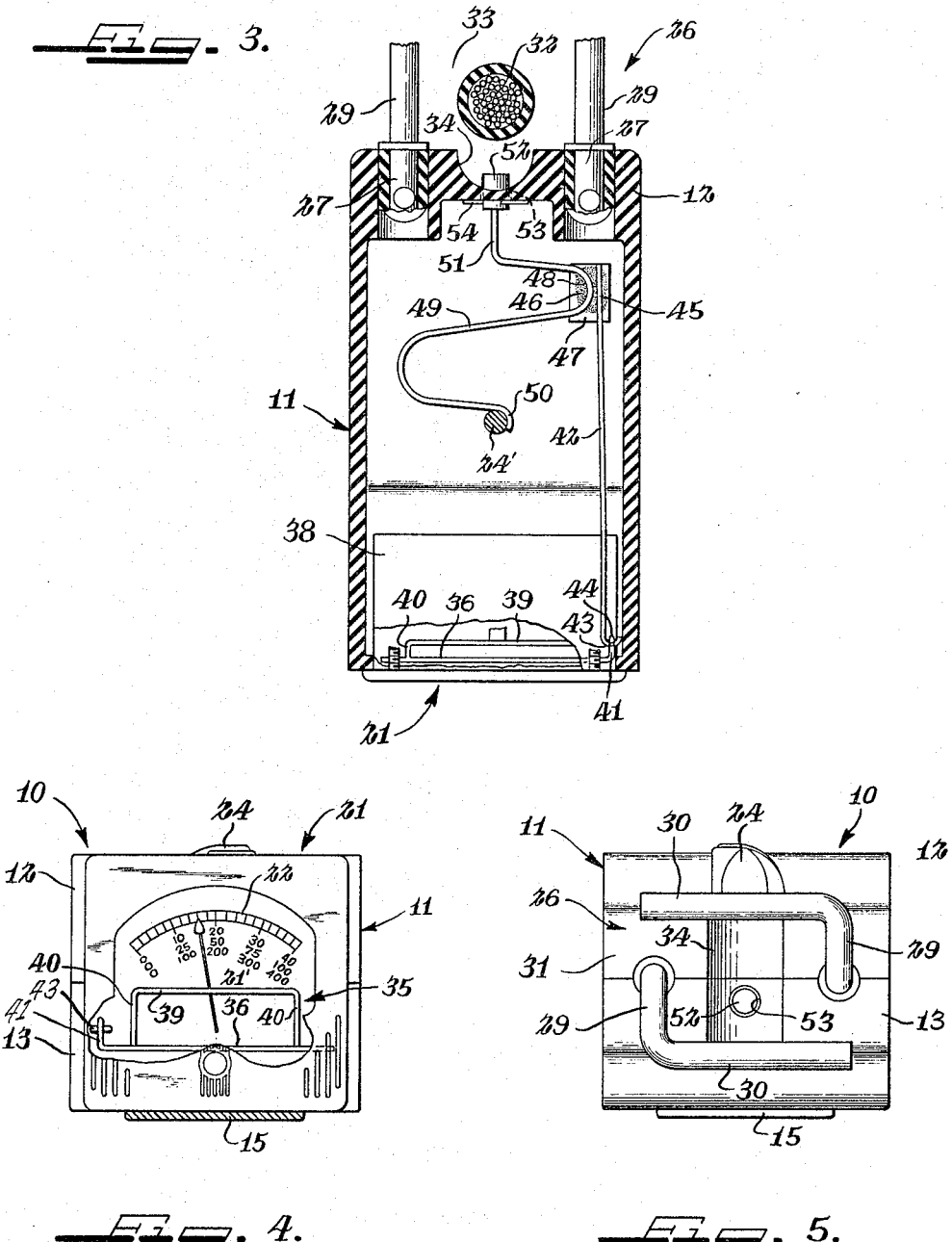

United States Patent Office 3,277,368
Patented Oct. 4, 1966

3,277,368
ELECTRIC MEASURING INSTRUMENT WITH POINTER CLAMP
Edmund O. Schweitzer, Jr., 1002 Dundee Road, Northbrook, Ill.
Filed May 6, 1963, Ser. No. 278,271
3 Claims. (Cl. 324—127)

This invention relates, generally, to electric measuring instruments and it has particular relation to instruments for measuring current flow in a conductor carrying alternating current. It constitutes an improvement over the invention shown in my U.S. Patent No. 2,686,898, issued August 17, 1954.

The patent above referred to shows an instrument for measuring the flow of alternating current in a high voltage conductor. For example, the instrument is useful in measuring current flow in conductors energized at voltages of the order of 2.3 kv. and above. That instrument is arranged to be mounted at one end of a live line stick which is manipulated by a lineman standing on the ground. The instrument includes a magnetic circuit that can be placed in inductive relation to the conductor which then functions with respect to the magnetic circuit as a single turn primary winding. A secondary winding mounted on the magnetic core is arranged to energize a measuring instrument which includes a pointer that is movable relative to a scale with the position of the pointer indicating the magnitude of the current flow in the conductor.

When the instrument above referred to is employed for measurement of current flow in a conductor energized at a relatively high voltage, for example at a voltage of 34.5 kv. or above, it is necessary to employ a substantially longer live line stick for mounting the instrument than is required when the instrument is to be used in connection with current measurement in a conductor that is energized at a relatively low voltage, such as 2.3 kv. When this occurs, this pointer and the scale of the instrument are located at a correspondingly greater distance away from the lineman standing on the ground. It becomes difficult to read the instrument accurately since it is not feasible to provide a larger scale and pointer to accommodate the greater distance that the instrument is away from the observer.

Accordingly, among the objects of this invention are: To provide for holding the pointer in the position to which it is moved when a reading is taken; to clamp the pointer in such position; to release the clamp when the instrument is placed in operative position for measurement of current flow in the conductor; to effect the release of the pointer by engaging the conductor; to bias the clamp into holding engagement with the pointer; and to overcome the biasing action by moving the instrument into mechanical engagement with the conductor.

In the drawings:

FIG. 1 is a top plan view of a measuring instrument of the kind described in the patent above referred to in which the present invention is embodied.

FIG. 2 is a view, in side elevation, of the instrument shown in FIG. 1.

FIG. 3 is a vertical sectional view taken generally along the line 3—3 of FIG. 2.

FIG. 4 is a horizontal sectional view taken generally along the line 4—4 of FIG. 1, certain parts of the housing being broken away in order to show the internal details of construction.

FIG. 5 is a top plan view of the instrument disassociated from the conductor.

Referring now particularly to FIGS. 1 and 2 of the drawings, it will be observed that the reference character 10 designates, generally, an electric measuring instrument constructed as shown in the patent above referred to and embodying the present invention. The instrument 10 includes an insulating case, shown generally at 11, which may be made up of upper and lower case sections 12 and 13. The sections 12 and 13 may be formed initially in identical shape of suitable insulating material such as a phenolic condensation product or other plastic. The case sections 12 and 13 may be suitably drilled and tapped as may be required for assembly purposes. They may be held together, in part, by screws 14.

The insulating case 11 is arranged to be carried by a plate 15 which may be suitably secured to the underside of the lower case section 13. The plate 15 has an offset support portion 16 for receiving a fitting 17 that is detachably secured thereto by a bolt 18. The offset support portion 16 may be slotted to receive teeth which extend from the fitting 17 and serve to interlock the two parts together when the nut is tightened on the bolt 18. It will be understood that the fitting 17 is located at one end of an insulating handle 19 which may be formed of wood or other recognized insulating material which is employed by linemen in working on energized high voltage lines. Preferably the fitting 17 is a standard fitting which is adapted to cooperate with other instruments, such as saws, wrenches and the like, used by linemen in working on energized high voltage lines.

For the purpose of indicating the current flow a meter, shown generally at 21, is mounted in the enlarged lower ends of the upper and lower case sections 12 and 13. The meter 21 is of conventional construction and it has a scale 22, FIG. 4, which is positioned at right angles to the logitudinal axis of the case 11 and also to the longitudinal axis of the live line stick 19 carrying the fitting 17 at its upper end. This arrangement facilitates the reading of the position of a pointer 21' with respect to the scale 22 when the instrument 10 is held overhead in operative position with respect to a conductor the alternating current flowing through which is to be measured.

With a view to adjusting the instrument 10 for measuring different magnitudes of current, a selector switch, shown generally at 23, is provided having a handle 24 which extends above the upper case section 12. The selector switch 23 includes an operating shaft 24' on which the handle 24 is mounted and, as described in the patent above referred to, it is arranged to make different connections, depending upon the current range which is to be measured. A scale, shown generally at 25 in FIG. 1, indicates the particular scale on the meter 21 which is to be read for a given switch position.

At the end of the case 11 opposite the meter 21 there is provided a generally rectangular magnetic core structure which is indicated at 26. The core structure 26 is formed by a rod of suitable magnetic material having a circular cross section. It is shaped to include side members 27 which are joined together by a connecting section on which a secondary winding is mounted as described in the patent above referred to. It will be observed that the side members 27 and the connecting section are coplanar and that they are located within the upper end of the case 11. Side member portions 29 extend from the side members 27 in opposite directions as shown more clearly in FIGS. 2 and 5 of the drawings. The purpose of this construction is to support arms 30 in spaced apart relation in a plane which is generally normal to the plane containing the side members 27. Between the spaced apart arms 30 a permanent entrance slot 31, FIG. 2, is formed for receiving a conductor 32 through which alternating current is flowing. It will be understood that the instrument 10 is placed in operative position with respect to the conductor 32 by first placing the spaced apart arms 30 parallel thereto and then moving the instrument bodily so that the conductor 32 occupies a position between the arms 30 in the entrance slot 31. Thereafter the instrument 10 is rotated bodily through 90° so that it extends at right angles to a window 33 which is provided through the core structure 26.

In order to place the conductor 32 in a predetermined position with respect to the magnetic core structure 26 so that uniform results are obtained in the operation of the meter 21, centering means in the form of a groove 34 is provided in the end of the instrument case 11 as shown more clearly in FIGS. 1, 3 and 5 of the drawings. The groove 34 is semi-circular in cross section and its diameter is large enough to receive the maximum diameter conductor 32, including the insulation covering thereon, which is likely to be encountered. It serves to center the conductor 32 within the magnetic core structure 26 automatically and without requiring particular attention on the part of the lineman.

The details of construction of the electric measuring instrument 10, as set forth above, also are set forth in the patent referred to hereinbefore. Since it is not feasible to increase the dimensions of the pointer 21' and the scale 22 together with the scale markings thereon in order to accommodate positioning of the instrument 10 at greater and greater distances from the lineman, provision is made in accordance with this invention for holding the pointer 21' in any position to which it may be operated according to the magnitude of the current flow through the conductor 32. Then, when the instrument is removed from the conductor 32 and lowered to the ground, the reading is retained and can be read accurately, since the scale 22 and pointer 21' then can be observed at relatively close range.

For this purpose clamp means, shown generally at 35, in FIG. 4 is provided. Clamp means 35 includes a shaft 36 the ends of which extend through and are journaled in openings 37, FIG. 2, in a cylindrical housing 38 that forms a part of the meter 21. Extending parallel to the shaft 36 is a clamp bar 39. It will be noted that the clamp bar 39 is substantially coextensive with the scale 22 and that it is arranged to overlie the pointer 21' in any position to which it may be moved for indicating current flow in the conductor 32. The clamp bar 39 is provided with laterally extending end portions 40 which are secured to the shaft 36 and extend radially therefrom. The arrangement is such that the clamp bar 39 is swung to engage the pointer 21' under spring tension where it is held against movement by the retrieving spring which tends to return it to the zero position.

For operating the shaft 36 and thereby rotating the clamp bar 39 therewith a crank arm 41 is positioned to the one end of the shaft 36. To its distal end an offset operating rod 42 is connected. As shown in FIG. 3 a hook 43 is positioned at one end of the rod 42 for pivotal connection with eye 44 at the distal end of the crank arm 41. The other end 45 of the operating rod 42 is secured by solder 46 to a plate 47. Also secured by the solder 46 to the plate 47 is a loop 48 of an S-shaped spring 49. A hook end 50 of the spring 49 overlies and reacts against the shaft 24' of the switch 23 on which the handle 24 is exteriorly mounted. It will be understood that the spring 49 reacts through the rod 42 to rotate the clamp bar 39 into engagement with the pointer 21' and hold it in clamped position.

In order to overcome the biasing action of the spring 39 and release the clamp bar 39 from clamping engagement with the pointer 21' the other end 51 of the spring 49 extends into a push button 52 that is slidably mounted in a cylindrical opening 53 which is located at the bottom of the groove 34. A transverse pin 54 which extends through the inner end of the push button 52 serves to limit its outward movement under the influence of the spring 49.

In operation, when the instrument 10 is applied to the conductor 32 for measuring the current flow therethrough, the spring 49 acting through the operating rod 42 holds the pointer 21' against movement with respect to the scale 22. Also the spring 49 holds the push button 52 in the elevated position as shown in FIG. 3. Now when the instrument 10 is moved to position the conductor 32 in the groove 34, the outer end of the push button 52 is engaged mechanically by the outer surface of the conductor 32 or the insulating housing therearound, if the same is used. This action further stresses the spring 49 and the movement of the push button 52 is translated through the end 51 and the operating rod 42 to the crank arm 41 on the shaft 36. It is rotated and, as a result, the clamp bar 39 is swung out of clamping engagement with the pointer 21'.

The pointer 21' now is free to swing relative to the scale 22 and it takes up a position that corresponds to the magnitude of the current flow through the conductor 32. As soon as the pressure on the instrument 10 through the insulating handle 19 is relieved and it is moved away from the conductor 32, the spring 49 promptly acts through the operating rod 42 to move the clamp bar 39 into clamping engagement with the pointer 21'. The pointer 21' then is held in the position to which it was operated by the magnetic field generated by the flow of alternating current through the conductor 32. Thereafter the instrument 10 can be rotated about its longitudinal axis to move the magnetic core structure 26 out of engagement with the conductor 32. When the instrument 10 is lowered to the ground, the pointer 21' is held in the position to which it was operated in the manner described. A reading then can be taken accurately as to the amount of current flow.

What is claimed as new is:

1. Means for measuring the flow of alternating current in a conductor comprising:
   (a) a meter case,
   (b) a magnetic core extending from said case and providing a window for receiving said conductor,
   (c) a meter element on said case electrically connected to said magnetic core and having a pointer whose position relative to a scale on said meter indicates the magnitude of current flow through said conductor.
   (d) a clamp member for said pointer movably mounted on said case,
   (e) means biasing said clamp member into engagement with said pointer and preventing movement thereof, and
   (f) means for overcoming the action of said biasing means to release said pointer for movement relative to said scale including means extending outwardly of said meter case and adapted to be engaged by said conductor in operative position in said window of said magnetic core for moving said clamp member out of engagement with said pointer.

2. The invention, as set forth in claim 1, wherein:
   (a) the meter case has a groove for receiving the conductor, and
   (b) the means for overcoming the action of the biasing means is a push button slidably mounted at the bottom of said groove for movement transversely thereof.

3. The invention, as set forth in claim 2, wherein the clamp member comprises:
(a) shaft rotatably mounted on the meter case,
(b) a clamp bar overlying the pointer in any position to which it may be moved with respect to the scale and secured in offset relation to said shaft, and
(c) a crank arm on said shaft for connection to the push button.

References Cited by the Examiner

UNITED STATES PATENTS

| | | | |
|---|---|---|---|
| 2,686,898 | 8/1954 | Schweitzer | 324—127 |
| 3,155,810 | 11/1964 | Parrott | 324—154 X |

FOREIGN PATENTS 312,522  5/1929  Great Britain.

WALTER L. CARLSON, *Primary Examiner.*
RUDOLPH V. ROLINEC, *Examiner.*